US007479066B2

(12) United States Patent
Emori

(10) Patent No.: US 7,479,066 B2
(45) Date of Patent: Jan. 20, 2009

(54) GAMING MACHINE

(75) Inventor: Kazuki Emori, Tokyo (JP)

(73) Assignee: Aruze Corp., Tokyo (JP)

( * ) Notice: Subject to any disclaimer, the term of this patent is extended or adjusted under 35 U.S.C. 154(b) by 707 days.

(21) Appl. No.: 10/697,042

(22) Filed: Oct. 31, 2003

(65) Prior Publication Data

US 2004/0192445 A1 Sep. 30, 2004

(30) Foreign Application Priority Data

Nov. 18, 2002 (JP) ............................ 2002-334124

(51) Int. Cl.
*A63F 13/00* (2006.01)
*A63F 9/24* (2006.01)

(52) U.S. Cl. ............................ 463/46; 463/47; 463/16; 273/138.1

(58) Field of Classification Search ............. 463/16-20, 463/46-47; 273/138.1

See application file for complete search history.

(56) References Cited

U.S. PATENT DOCUMENTS

| | | | | |
|---|---|---|---|---|
| 4,440,457 | A * | 4/1984 | Fogelman et al. | 463/46 |
| 5,636,101 | A * | 6/1997 | Bonsall et al. | 361/681 |
| 6,128,183 | A * | 10/2000 | Uchiyama et al. | 361/681 |
| 6,164,645 | A * | 12/2000 | Weiss | 273/138.2 |
| 6,201,703 | B1 * | 3/2001 | Yamada et al. | 361/752 |
| 6,556,450 | B1 | 4/2003 | Rasmussen et al. | |
| 6,559,829 | B1 * | 5/2003 | Matsuo et al. | 345/156 |
| 7,075,783 | B2 * | 7/2006 | Jeong et al. | 361/681 |
| 2002/0006828 | A1 * | 1/2002 | Gerding | 463/46 |
| 2004/0018870 | A1 | 1/2004 | Cole | |

FOREIGN PATENT DOCUMENTS

EP 0546780 A1 6/2003

(Continued)

OTHER PUBLICATIONS

International Search Report, mailed on Aug. 11, 2004.

(Continued)

*Primary Examiner*—Robert E Pezzuto
*Assistant Examiner*—Sunit Pandya
(74) *Attorney, Agent, or Firm*—Rader, Fishman & Grauer, PLLC

(57) ABSTRACT

A pinball slot machine includes a board on which a main control circuit for determining an internal lottery of a game with a random number at a predetermined timing is placed, a liquid crystal display for displaying an effect image pertinent to the game, a liquid crystal display control board 720*a*, and hooks 223*a* and 223*b* and projections 724*a* and 724*b* having attachment holes for hooking the liquid crystal display control board 720*a* on a cabinet section 200*b* of the gaming machine. To attach the liquid crystal display control board 720*a* to the cabinet section 200*b* of the gaming machine, the hooks 223*a* and 223*b* are inserted into the attachment holes for temporarily tacking the liquid crystal display control board 720*a*. In this state, the liquid crystal display control board 720*a* is screwed at upper left and right ends into a door 200*a*.

3 Claims, 16 Drawing Sheets

FOREIGN PATENT DOCUMENTS

| | | | |
|---|---|---|---|
| JP | 2-77089 | | 6/1990 |
| JP | 5-285265 | | 11/1993 |
| JP | 6-154400 | | 6/1994 |
| JP | 7-031717 | | 2/1995 |
| JP | 10-201923 | | 8/1998 |
| JP | 2001-170249 | A1 | 6/2001 |
| JP | 2001-340519 | | 12/2001 |

OTHER PUBLICATIONS

English translation of Office Action for Japanese application No. 2002-334124 dated Feb. 13, 2007.

English translation of Office Action for Japanese application No. 2002-334124 dated Jul. 24, 2007.

* cited by examiner

FIG. 8

PRIZES AND NUMBERS OF PAYOUT MEDALS CORRESPONDING TO WINNING SYMBOL COMBINATIONS IN EACH GAMING STATE

| SYMBOL COMBINATION | ORDINARY GAMING STATE | ORDINARY GAMING STATE IN BB | RB GAMING STATE |
|---|---|---|---|
| RED 7-RED 7-RED 7 | BB, 15 MEDALS | — | — |
| BLUE 7-BLUE 7-BLUE 7 | BB, 15 MEDALS | — | — |
| BAR-BAR-BAR | RB, 15 MEDALS | — | — |
| BELL-BELL-BELL | SMALL PRIZE OF BELL, 15 MEDALS | SMALL PRIZE OF BELL, 15 MEDALS | — |
| BAR-REPLAY-REPLAY | SMALL PRIZE OF BAR, THREE MEDALS | SMALL PRIZE OF BAR, THREE MEDALS | — |
| PLUM-PLUM-PLUM | SMALL PRIZE OF PLUM, SIX MEDALS | SMALL PRIZE OF PLUM, SIX MEDALS | — |
| REPLAY-REPLAY-REPLAY | REPLAY, 0 MEDAL | RB (JAC IN), 15 MEDALS | PRIZE, 15 MEDALS |
| CHERRY-○-○ | SMALL PRIZE OF CHERRY, TWO OR FOUR MEDALS | SMALL PRIZE OF CHERRY, TWO OR FOUR MEDALS | — |

FIG. 10

WINNING STOP CONTROL TABLE
(INTERNAL WINNING COMBINATION: SMALL PRIZE OF BELL)

| LEFT REEL | | CENTER REEL | | RIGHT REEL | |
|---|---|---|---|---|---|
| STOP OPERATION POSITION | STOP CONTROL POSITION | STOP OPERATION POSITION | STOP CONTROL POSITION | STOP OPERATION POSITION | STOP CONTROL POSITION |
| 00 | 19 | 00 | 19 | 00 | 18 |
| 01 | 19 | 01 | 19 | 01 | 01 |
| 02 | 19 | 02 | 19 | 02 | 01 |
| 03 | 03 | 03 | 03 | 03 | 01 |
| 04 | 03 | 04 | 03 | 04 | 01 |
| 05 | 03 | 05 | 03 | 05 | 05 |
| 06 | 03 | 06 | 03 | 06 | 05 |
| 07 | 03 | 07 | 07 | 07 | 05 |
| 08 | 08 | 08 | 07 | 08 | 05 |
| 09 | 08 | 09 | 07 | 09 | 05 |
| 10 | 08 | 10 | 07 | 10 | 10 |
| 11 | 11 | 11 | 11 | 11 | 10 |
| 12 | 11 | 12 | 11 | 12 | 10 |
| 13 | 11 | 13 | 11 | 13 | 10 |
| 14 | 11 | 14 | 11 | 14 | 14 |
| 15 | 15 | 15 | 15 | 15 | 14 |
| 16 | 15 | 16 | 15 | 16 | 14 |
| 17 | 15 | 17 | 15 | 17 | 14 |
| 18 | 15 | 18 | 15 | 18 | 18 |
| 19 | 19 | 19 | 19 | 19 | 18 |
| 20 | 19 | 20 | 19 | 20 | 18 |

FIG. 11

FORWARD PUSH, CENTER PUSH LOSING STOP CONTROL TABLE
(INTERNAL WINNING COMBINATION: SMALL PRIZE OF BELL)

| LEFT REEL | | CENTER REEL | | RIGHT REEL | |
|---|---|---|---|---|---|
| STOP OPERATION POSITION | STOP CONTROL POSITION | STOP OPERATION POSITION | STOP CONTROL POSITION | STOP OPERATION POSITION | STOP CONTROL POSITION |
| 00 | 19 | 00 | 19 | 00 | 19 |
| 01 | 19 | 01 | 19 | 01 | 19 |
| 02 | 19 | 02 | 19 | 02 | 02 |
| 03 | 03 | 03 | 03 | 03 | 02 |
| 04 | 03 | 04 | 03 | 04 | 02 |
| 05 | 03 | 05 | 03 | 05 | 02 |
| 06 | 03 | 06 | 03 | 06 | 06 |
| 07 | 03 | 07 | 07 | 07 | 06 |
| 08 | 08 | 08 | 07 | 08 | 06 |
| 09 | 08 | 09 | 07 | 09 | 06 |
| 10 | 08 | 10 | 07 | 10 | 06 |
| 11 | 11 | 11 | 11 | 11 | 11 |
| 12 | 11 | 12 | 11 | 12 | 11 |
| 13 | 11 | 13 | 11 | 13 | 11 |
| 14 | 11 | 14 | 11 | 14 | 11 |
| 15 | 15 | 15 | 15 | 15 | 15 |
| 16 | 15 | 16 | 15 | 16 | 15 |
| 17 | 15 | 17 | 15 | 17 | 15 |
| 18 | 15 | 18 | 15 | 18 | 15 |
| 19 | 19 | 19 | 19 | 19 | 19 |
| 20 | 19 | 20 | 19 | 20 | 19 |

FIG. 12

REVERSE PUSH LOSING STOP CONTROL TABLE
(INTERNAL WINNING COMBINATION: SMALL PRIZE OF BELL)

| LEFT REEL | | CENTER REEL | | RIGHT REEL | |
|---|---|---|---|---|---|
| STOP OPERATION POSITION | STOP CONTROL POSITION | STOP OPERATION POSITION | STOP CONTROL POSITION | STOP OPERATION POSITION | STOP CONTROL POSITION |
| 00 | 20 | 00 | 19 | 00 | 18 |
| 01 | 20 | 01 | 19 | 01 | 01 |
| 02 | 20 | 02 | 19 | 02 | 01 |
| 03 | 20 | 03 | 03 | 03 | 01 |
| 04 | 04 | 04 | 03 | 04 | 01 |
| 05 | 04 | 05 | 03 | 05 | 05 |
| 06 | 04 | 06 | 03 | 06 | 05 |
| 07 | 04 | 07 | 07 | 07 | 05 |
| 08 | 04 | 08 | 07 | 08 | 05 |
| 09 | 09 | 09 | 07 | 09 | 05 |
| 10 | 09 | 10 | 07 | 10 | 10 |
| 11 | 09 | 11 | 11 | 11 | 10 |
| 12 | 12 | 12 | 11 | 12 | 10 |
| 13 | 12 | 13 | 11 | 13 | 10 |
| 14 | 12 | 14 | 11 | 14 | 14 |
| 15 | 12 | 15 | 15 | 15 | 14 |
| 16 | 12 | 16 | 15 | 16 | 14 |
| 17 | 17 | 17 | 15 | 17 | 14 |
| 18 | 17 | 18 | 15 | 18 | 18 |
| 19 | 17 | 19 | 19 | 19 | 18 |
| 20 | 20 | 20 | 19 | 20 | 18 |

GAMING MACHINE

BACKGROUND OF THE INVENTION

1. Field of the Invention

The present invention relates to a gaming machine including a liquid crystal display.

2. Description of the Related Art

A recent slot machine including stop buttons (a so-called “pinball slot machine” or a so-called “Pachi-Slot machine” in Japan) has a mechanical variable display means provided with a plurality of rotation reels for variably displaying symbols in a front display window or an electric variable display means for displaying symbols on reels on a screen. As the player performs start operation, control means controls the variable display means for rotating the reels, thereby producing variable display of symbols. Then, the rotatable reels are stopped in order automatically in a given time or as the player performs stop operation. At this time, if the symbols on the reels appearing in the display window become a specific combination (winning symbol combination), game medium such as medals or coins are paid out to the player as the prize of the win.

In the current mainstream model, a cabinet of a gaming machine has a door that can be opened and closed and a display panel section is provided in front of the door. The display panel section is provided with a display window for the player to visually observe symbols on reels, and further a display screen of a liquid crystal display is provided in a lower position of the display window. On the other hand, a liquid crystal display control board covered with a transparent resin case is attached to the rear of the door. In the gaming machine in the related art, the four corners of the liquid crystal display control board are fixed at positions lower than the display screen on the rear of the door. The attachment of the display control board is generally made by fixing the four corners of the liquid crystal display control board with screws.

The above structure is disclosed in JP-A-2001-170249 (see FIG. 5, etc.).

SUMMARY OF THE INVENTION

However, in the gaming machine in the related art, the four corners of the liquid crystal display control board are fixed with screws. Therefore, there is a problem that when the liquid crystal display control board is attached or detached, the board needs to be positioned and attached while it is held.

It is an object of the invention to provide a gaming machine for facilitating work of attaching and detaching a liquid crystal display control board and reducing the number of steps.

In order to achieve the above object, according to the invention, there is provided a gaming machine including: internal lottery means (for example, main control circuit 71) configured to determine an internal lottery of a game with a random number at a predetermined timing; display means (for example, liquid crystal display 5) configured to display an effect image pertinent to the game; display control means (for example, liquid crystal display control board 720*a*) configured to control the display means; and attachment means (for example, hooks 223*a* and 223*b*, projections 724*a* and 724*b* formed with attachment holes, and a plastic fastener (such as a snap fit)) configured to attach the display control means on a cabinet of the gaming machine.

According to the configuration, the display control means is attached onto the cabinet and thus can be temporarily tacked to the cabinet using the attachment means and can be positioned. As the display control means is temporarily tacked, the attachment work of the display control means is facilitated and further the number of fixed parts can be reduced, so that the number of fixing steps can be decreased. Therefore, the assembling and disassembling work of the gaming machine is eased. Since detachment work is also easy to conduct, it is suited for recycling the display control means.

In the gaming machine of the invention, the attachment means may have a hook (for example, hook 223*a*, 223*b*) provided on the display control means or the cabinet and a hook hole (for example, attachment hole of projection 724*a*, 724*b*) formed on the cabinet or the display control means.

According to the configuration, the display control means can be temporarily tacked to the cabinet simply by inserting the hook into the hook hole. Thus, the display control means can be easily attached and detached as compared with the case where immediately the display control means is fixed to the cabinet. Therefore, the assembling and disassembling work of the gaming machine is eased. It is also suited for recycling the display control means.

In the gaming machine of the invention, the display control means may be hooked at an upper end of the cabinet (for example, upper end of the rear of door 200*a* of the cabinet) using the hook and the hook hole and may be fixed at a predetermined point.

According to the configuration, the display control means is disposed at the upper end of the cabinet and is hooked using the hook and the hook hole and further is fixed with a screw and the like, so that while the necessary number of steps is decreased, the display control means can be temporarily tacked and positioned before it is reliably fixed. Therefore, the assembling and disassembling work of the gaming machine is eased. It is also suited for maintaining and recycling the display control means.

BRIEF DESCRIPTION OF THE DRAWINGS

In the accompanying drawings:

FIG. 8 is a drawing to show prizes and numbers of payout medals corresponding to winning symbol combinations in the first embodiment of the invention;

FIG. 10 is a drawing to show a winning stop control table used when internal winning of small prize is accepted in the first embodiment of the invention;

FIG. 11 is a drawing to show a forward push, center push losing stop control table used when internal winning of small prize is accepted in the first embodiment of the invention;

FIG. 12 is a drawing to show a reverse push losing stop control table used when internal winning of small prize is accepted in the first embodiment of the invention;

DETAILED DESCRIPTION OF THE PREFERRED EMBODIMENTS

Referring now to the accompanying drawings, there are shown preferred embodiments of the invention.

First Embodiment

Figure 1:
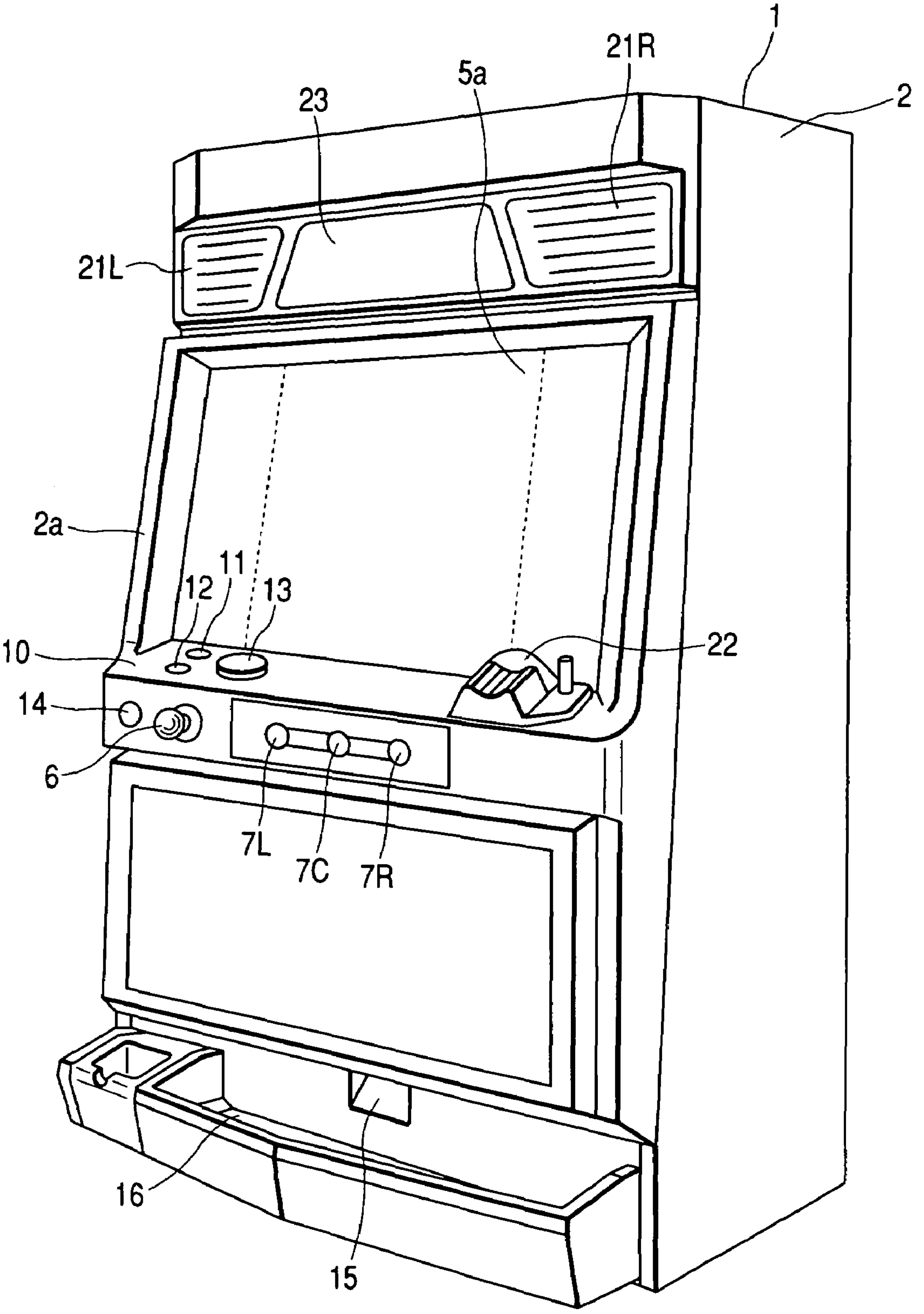
FIG. 1 is a drawing to show a first embodiment of a gaming machine according to the invention and is a perspective view to show the appearance of a pinball slot machine as gaming machine.
Figure 2:
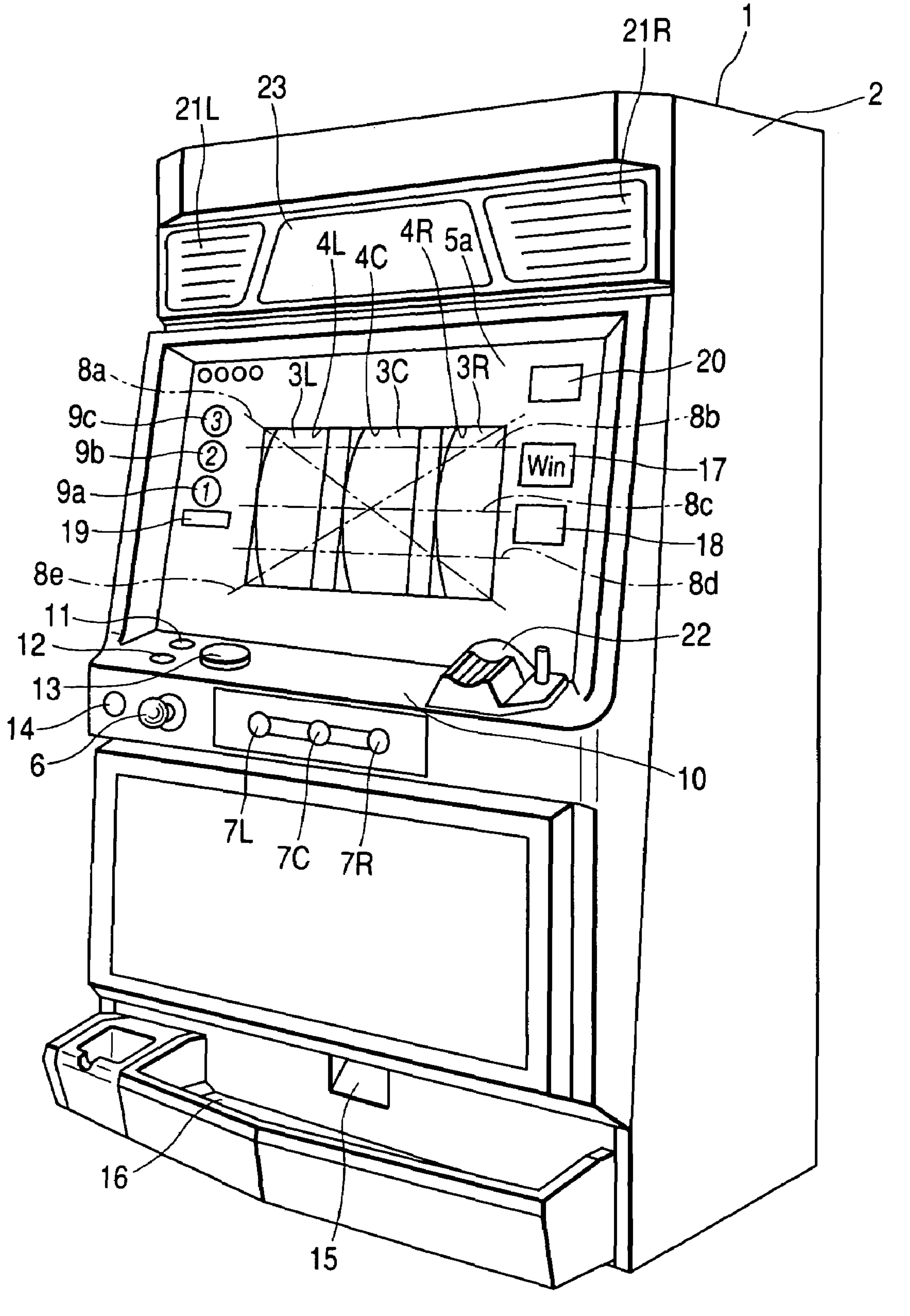
FIG. 2 is a perspective view to show the appearance of the pinball slot machine with reels displayed in the first embodiment of the invention.

FIG. 1 shows a first embodiment applying a gaming machine according to the invention to a Pachi-Slot machine. In FIG. 1, BET lamps 9*a*, 9*b*, and 9*c*, a WIN lamp 17, a payout display unit 18, a credit display unit 19, and a bonus game information display unit 20 (described later) are not shown. FIG. 2 shows a state that a full screen display is not displayed by a liquid crystal display in a display screen 5*a*, and reels 3 placed at the back of the liquid crystal are displayed through the display screen 5*a* (liquid crystal display).

To being with, the configuration will be discussed. In FIGS. 1 and 2, a pinball slot machine 1 as a gaming machine is provided for the player to play a game using game medium such as a card storing information of the game play value given to the player as well as coins, medals, tokens, etc. In the description that follows, it is assumed that the player uses medals.

A panel display unit 2*a* roughly as a vertical plane is formed at the front of a cabinet 2 forming the whole of the pinball slot machine 1 and a rectangular 15-inch liquid crystal display screen (also called display screen) 5*a* is provided in front of the panel display unit 2*a*. An image can be displayed over the full face of the display screen 5*a*. The cabinet 2 is provided with a door (200*a* in FIG. 3) that can be opened and closed, and a liquid crystal display 5 and a liquid crystal display control board (720*a* in FIG. 3) are provided at the rear of the door. The BET lamps 9*a*, 9*b*, and 9*c*, the WIN lamp 17, the payout display unit 18, the credit display unit 19, and the bonus game information display unit 20 (described later) are displayed under the control of a main control circuit 71 (shown in FIG. 9) outside the liquid crystal display screen 5*a*.

Figure 3:
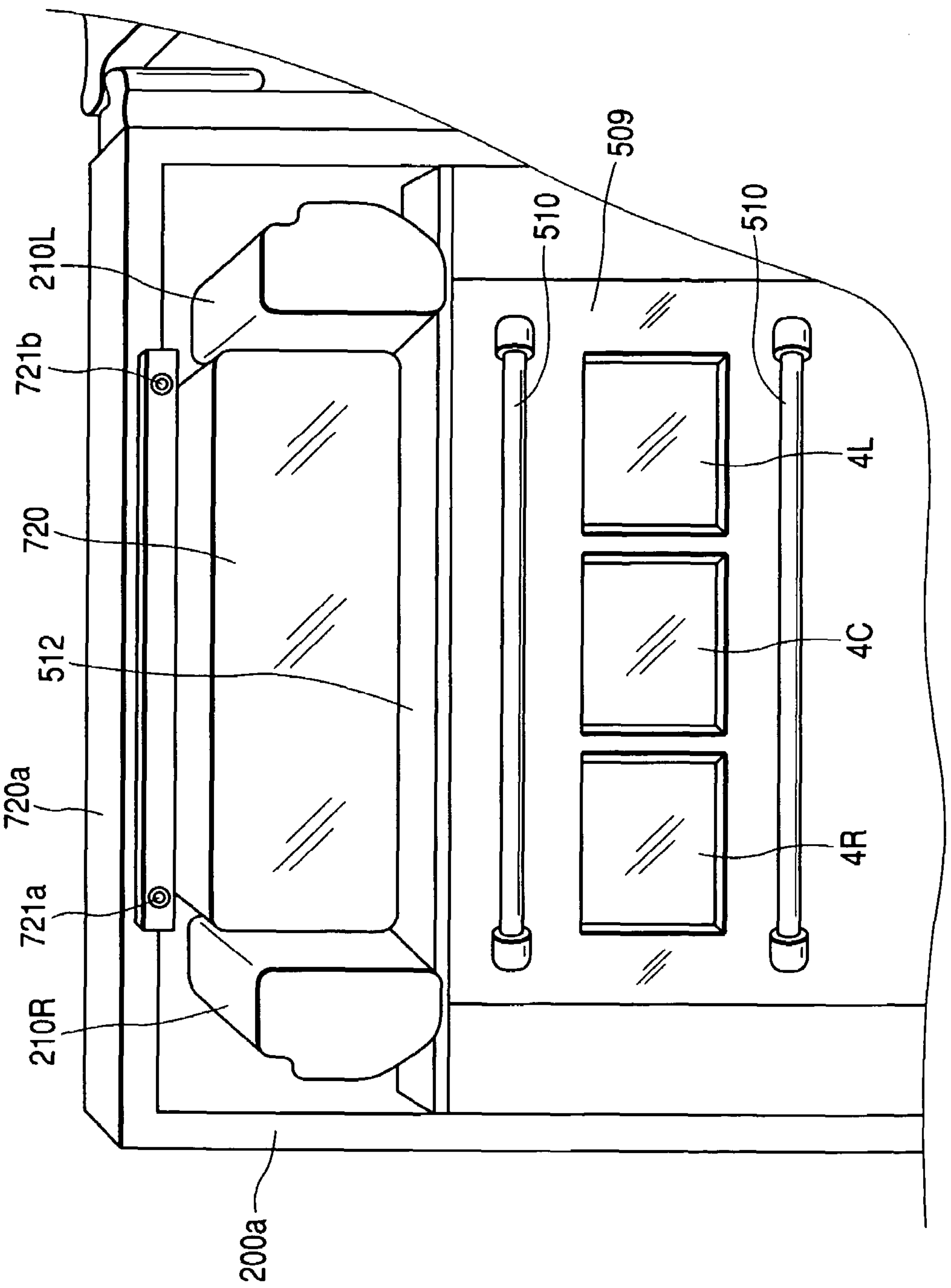
FIG. 3 is a drawing to show the rear of a door in the first embodiment of the invention.

The configuration of a part of the rear of the door is as shown in FIG. 3. In FIG. 3, the liquid crystal display control board 720*a* for controlling display of the liquid crystal display 5 is housed in a transparent resin case 720 and is attached to the rear of the door 200*a* of the cabinet 2 (a part of the cabinet), namely, an upper frame part of the door 200*a*. Liquid crystal display parts including an antistatic sheet 509 and a display driver 512 of the liquid crystal display 5 are disposed below the liquid crystal display control board 720*a*. Semi-transparent covers 210L and 210R for covering speakers 21L and 21R are placed at the left and right of the resin case 720.

A method of attaching the liquid crystal display control board 720*a* housed in the resin case 720 will be discussed with reference to FIGS. 4 and 5.

Figure 4A:
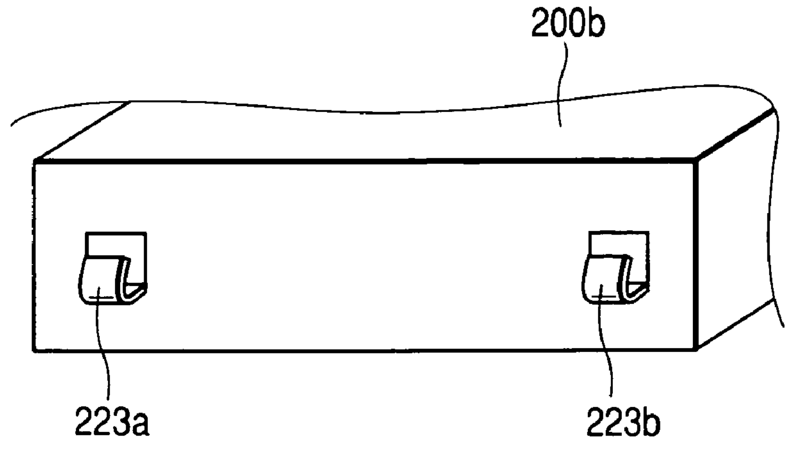
FIGS. 4A and 4B are drawings to show a part of a cabinet and the back of a liquid crystal display control board attached to the cabinet in the first embodiment of the invention.
Figure 4B:
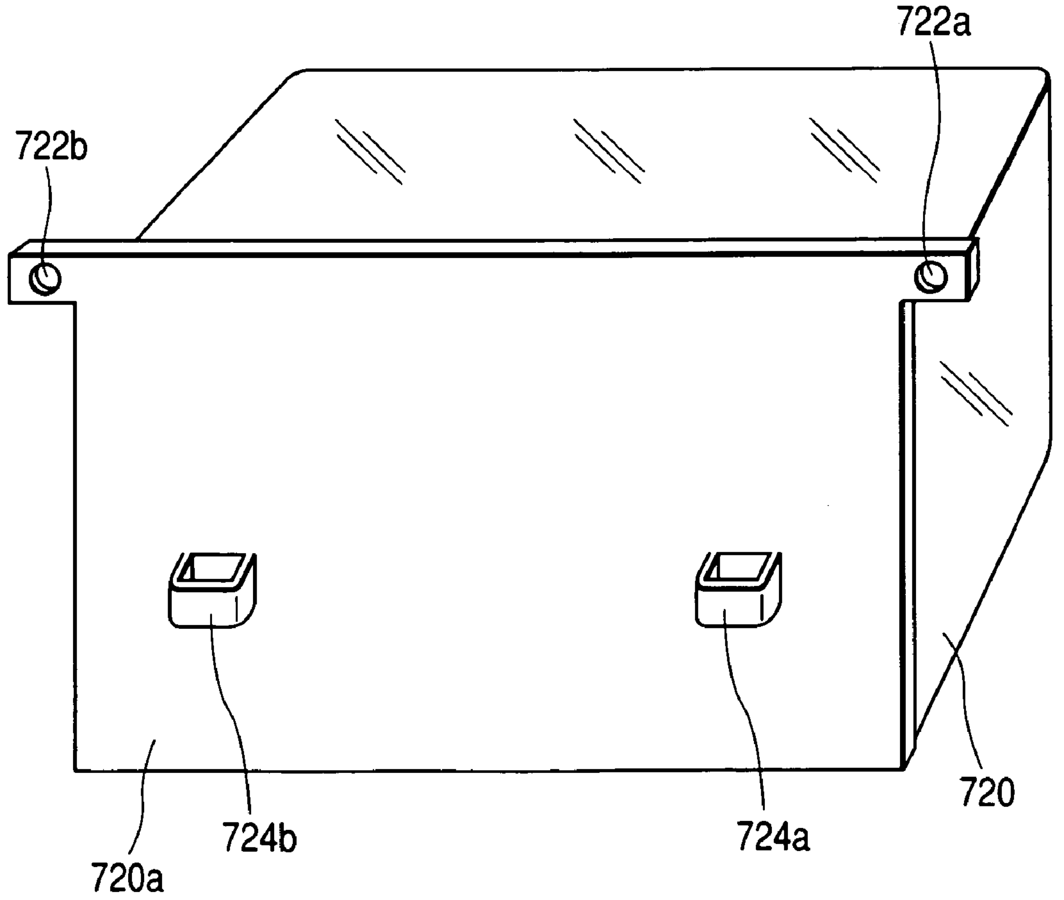

In FIG. 4A, a cabinet section 200*b* (a part of the cabinet) lower than the upper frame of the door 200*a* of the cabinet 2 of the pinball slot machine 1 is formed with two hooks 223*a* and 223*b* upward and roughly horizontally. On the other hand, in FIG. 4B, the liquid crystal display control board 720*a* to be attached to the cabinet section 200*b* is formed in lower positions of the back with two projections 724*a* and 724*b* each having an attachment hole (hook hole) so that the projections become roughly horizontal at the attachment time. The liquid crystal display control board 720*a* are formed at the upper left and right ends with two screw holes 722*a* and 722*b* for screwing so that the screw holes become roughly horizontal at the attachment time. The screw holes 722*a* and 722*b* are disposed outside the projections 724*a* and 724*b* and the spacing between the screw holes 722*a* and 722*b* is set larger than the spacing between the projections 724*a* and 724*b* to stabilize the attachment state as the fixed portion spacing is made large.

Figure 5A:
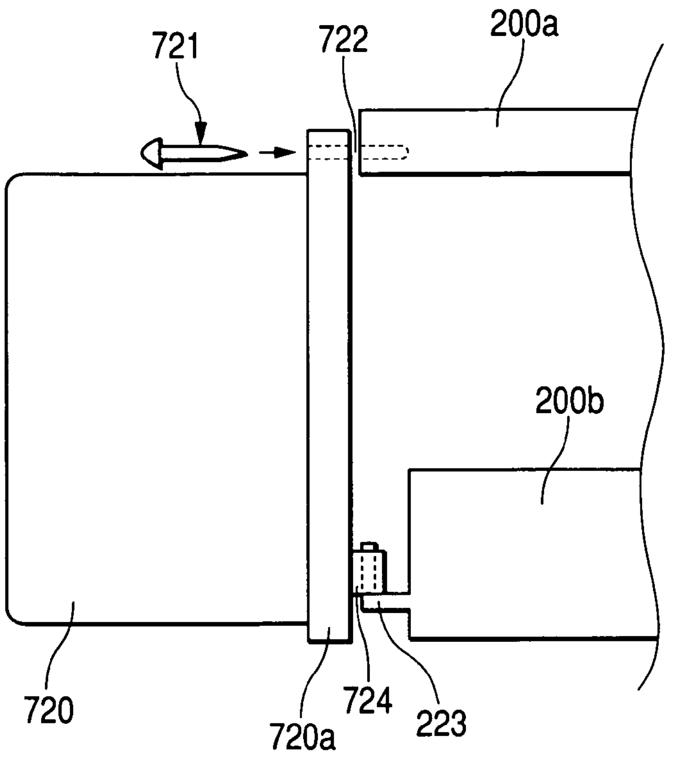
FIGS. 5A and 5B are drawings to show a method of attaching the liquid crystal display control board in the first embodiment of the invention.
Figure 5B:
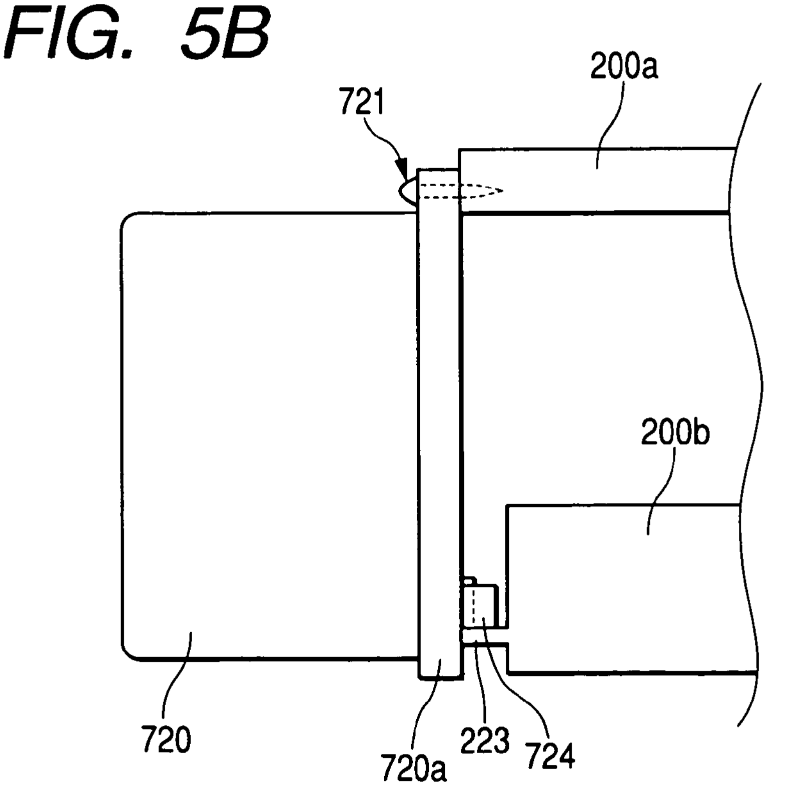

According to the configuration, first the hooks 223*a* and 223*b* formed on the cabinet section 200*b* are inserted into and attached onto the attachment holes of the projections 724*a* and 724*b* formed on the back of the liquid crystal display control board 720*a* for temporarily tacking the liquid crystal display control board 720*a* to the cabinet section 200*b* (FIG. 5A). Next, screws 721 are inserted into the screw holes 722 (722*a* and 722*b*) at the upper ends of the liquid crystal display control board 720*a* temporarily tacked to the cabinet section 200*b*, and the liquid crystal display control board 720*a* is screwed into the upper frame of the rear of the door 200*a* (FIG. 5B). In the embodiment, on the rear of the door 200*a*, the liquid crystal display control board 720*a* is disposed on the cabinet above the liquid crystal display 5 and parts of obstacles to upper move of the liquid crystal display control board 720*a* are not close to, so that hooking the liquid crystal display control board 720*a* using the hooks 223 and the attachment holes is facilitated.

Figure 6:
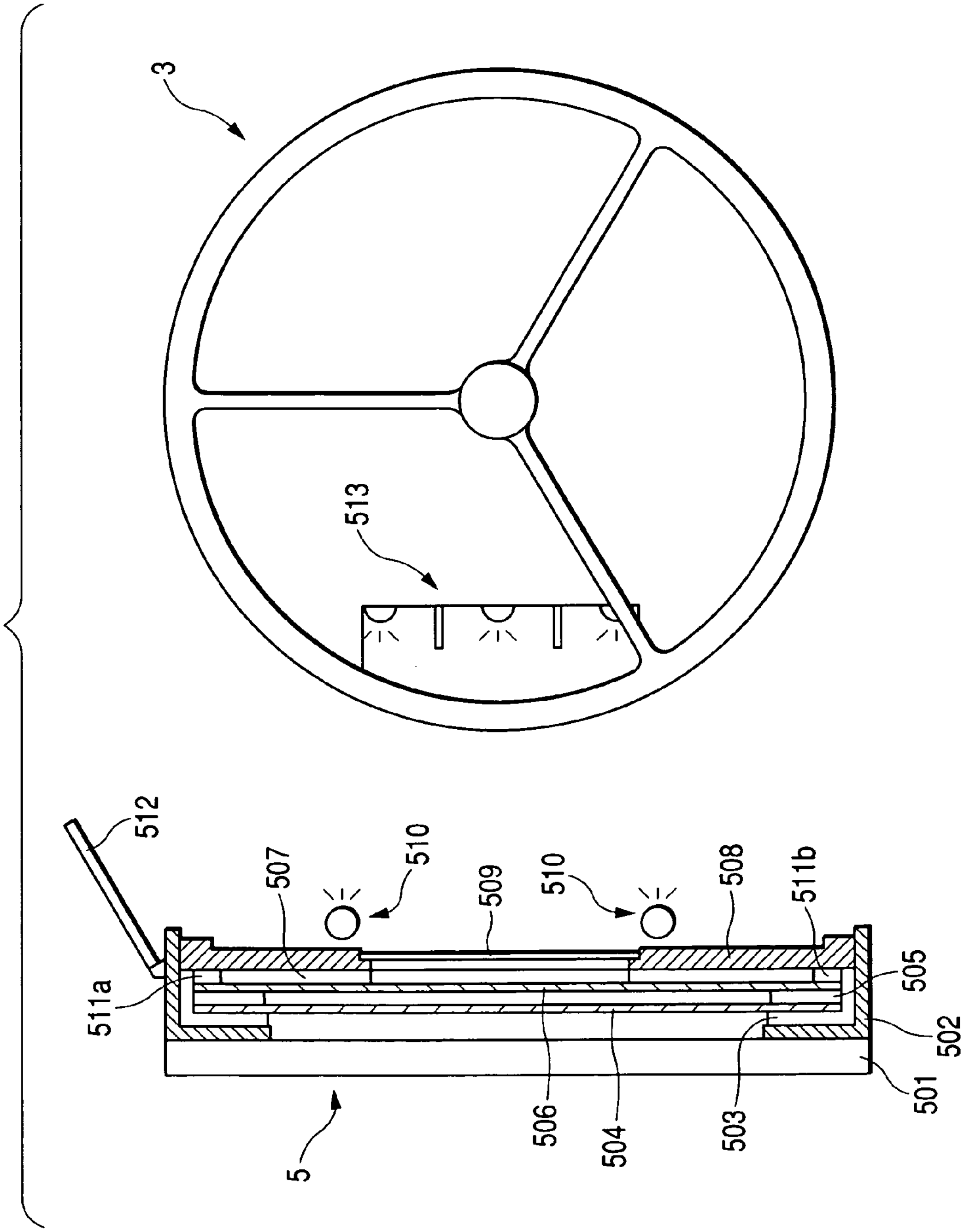
FIG. 6 is a drawing to show the configuration of a liquid crystal display in the first embodiment of the invention.

The configuration of the liquid crystal display 5 is as shown in FIG. 6. In FIG. 6, a transparent acrylic plate 501 is provided in front of the liquid crystal display 5, followed by a reel glass base 502, a bezel metal frame 503, liquid crystal 504, a liquid crystal holder 505, a diffuser sheet 506, a light guide plate 507, a rear holder 508, and an antistatic sheet 509 which are stacked in order. The light guide plate 507 is a plate material subjected to special treatment (containing laser beam machining) to uniformly reflect light on the back of acrylic plate, and receives light of cold-cathode tube 11*a*, 11*b* as light source from the end face, reflecting the light on the rear, and producing uniform surface light emission. The light guide plate 507 and the rear holder 508 are formed with vertically oriented rectangular display windows (4L, 4C, and 4R in FIG. 2). The display windows 4L, 4C, and 4R are visually observed through the liquid crystal display 5. The display driver 512 is disposed in the upper part of the liquid crystal display 505 for displaying the liquid crystal 504. The antistatic sheet 509 prevents dusts from being deposited on the portion corresponding to the reel window (display window). A fluorescent tube 510 is used as a backlight for the display windows. The display windows 4L, 4C, and 4R receive light from the fluorescent tube 510, reflected light produced as the light from the fluorescent tube 510 is reflected on the surfaces of the reels 3, and light of reel backlights 513 provided for the reels 3. The light enables the player to recognize the liquid crystal 504. The reel backlights 513 each having three longitudinally placed LEDs are provided in a one-to-one correspondence with the reels 3 for illuminating the symbols on the reels 3 from the backs of the reels 3.

The display windows 4L, 4C, and 4R in FIG. 2 are formed with a top line 8*b*, a center line 8*c*, and a bottom line 8*d* in the horizontal direction and a cross down line 8*a* and cross up line 8*e* in the slanting directions as pay lines. As the pay lines, one, three, or five lines are made activated as the player operates a 1-BET switch 11, a 2-BET switch 12, or a MAX-BET switch 13 (described later) or inserts medals into a medal insertion slot 22. Which pay lines are made activated is indicated as a BET lamp 9*a*, 9*b*, or 9*c* (described below) is lighted.

In the cabinet 2, three reels (left reel 3L, center reel 3C, and right reel 3R) each with a symbol row including different types of symbols placed on the outer peripheral surface are provided in a row for rotation, and are contained in symbol row display means. The player can observe the symbols on the reels through the display windows 4L, 4C, and 4R. Each reel rotates at a constant speed (for example, 80 revolutions per minute).

The 1-BET lamp 9*a*, the 2-BET lamp 9*b*, the MAX-BET lamp 9*c*, and a credit display unit 19 are provided on the left of the display windows 4L, 4C, and 4R. The 1-BET lamp 9*a*, the 2-BET lamp 9*b*, or the MAX-BET lamp 9*c* is lighted in response to the number of medals bet to play one game, which will be hereinafter referred to as the BET count.

In the embodiment, one game is over when all reels stop. When the BET count is 1 and one pay line is made activated, the 1-BET lamp 9*a* is lighted; when the BET count is 2 and three pay lines are made activated, the 2-BET lamp 9*b* is lighted; and when the BET count is 3 and all the five pay lines are made activated, the MAX-BET lamp 9*c* is lighted. The credit display unit 19 is made up of seven-segment LEDs for displaying the deposited number of medals.

The WIN lamp 17 and the payout display unit 18 are provided on the right of the display windows 4L, 4C, and 4R. The WIN lamp 17 is lighted when the winning game of BB or RB is complete. It is lighted at a predetermined probability when the internal winning is accepted as BB or RB. The payout display unit 18 is made up of seven-segment LEDs for displaying the number of medals paid out when the winning game is complete.

The bonus game information display unit 20 is provided in the upper right corner of the display screen 5*a* of the panel display unit 2*a*. The bonus game information display unit 20 is made up of seven-segment LEDs for displaying the number of RB games that can be played, and the possible number of winning games of RB (described later).

A frontward projection portion 10 of a horizontal plane is formed below the display screen 5*a*. The display screen 5*a* displays not only the various lamps and the various display units, but also various effects of animation and an "operation order" required for realizing completion of the winning game when the internal winning of "small prize of bell" is accepted in the "assistance time period".

The medal insertion slot 22 is provided at the right end of the frontward projection portion 10, and the 1-BET switch 11, the 2-BET switch 12, and the MAX-BET switch 13 are provided at the left end of the frontward projection portion 10. The 1-BET switch 11 enables the player to bet one of the credited medals by one push operation on a game. The 2-BET switch 12 enables the player to bet two of the credited medals by one push operation on a game. The MAX-BET switch 13 enables the player to bet as many medals as the maximum number of medals that can be bet on a game by one push operation. As the player operates any of the BET switches, the corresponding pay lines are made activated as described above.

A C/P switch 14 for the player to switch between credit and payout of the medals obtained by playing games by pushbutton operation is provided on the left of the front of the frontward projection portion 10. As the C/P switch 14 is switched, medals are paid out from a medal payout opening 15 in a lower position of the front and are stored in a game medal tray 16.

On the right of the C/P switch 14, a start lever 6 for rotating the reels for starting variable display of symbols in the display windows 4L, 4C, and 4R (starting a game) as the player operates the start lever 6 is attached so that it can be turned in a predetermined angle range.

The speakers 21L and 21R are provided on the upper left and right of the cabinet 2, and a payout table panel 23 for displaying winning symbol combination, the number of payout medals, and the like is provided between the two speakers 21L and 21R.

Three stop buttons (left stop button 7L, center stop button 7C, and right stop button 7R) as operation buttons contained in stop operation means for stopping rotation of the three reels 3L, 3C, and 3R are provided at the center of the front of the frontward projection portion 10 and below the display screen 5*a*.

In the embodiment, the stop operation performed by the player pushing the first stop button when all reels rotate is called "first stop operation," the stop operation next performed by the player pushing the second stop button is called "second stop operation," and the stop operation performed by the player pushing the third stop button following the second stop operation is called "third stop operation."

Since the pinball slot machine 1 of the embodiment is provided with the three stop buttons 7L, 7C, and 7R, there are six different operation orders of the stop buttons. Then, the operation orders are distinguished from each other as follows: The left stop button 7L is abbreviated to "left," the center stop button 7C to "center," and the right stop button 7R to "right."

To indicate the operation order, the abbreviations of the stop buttons 7L, 7C, and 7R are listed from left to right in the stop operation order. For example, when the player operates the left stop button 7L as the first stop operation, the center stop button 7C as the second stop operation, and the right stop button 7R as the third stop operation, the operation order is indicated as "left center right." In the embodiment, the six different operation orders of "left center right," "left right center," "center left right," "center right left," "right left center," and "right center left" are available.

Figure 7:
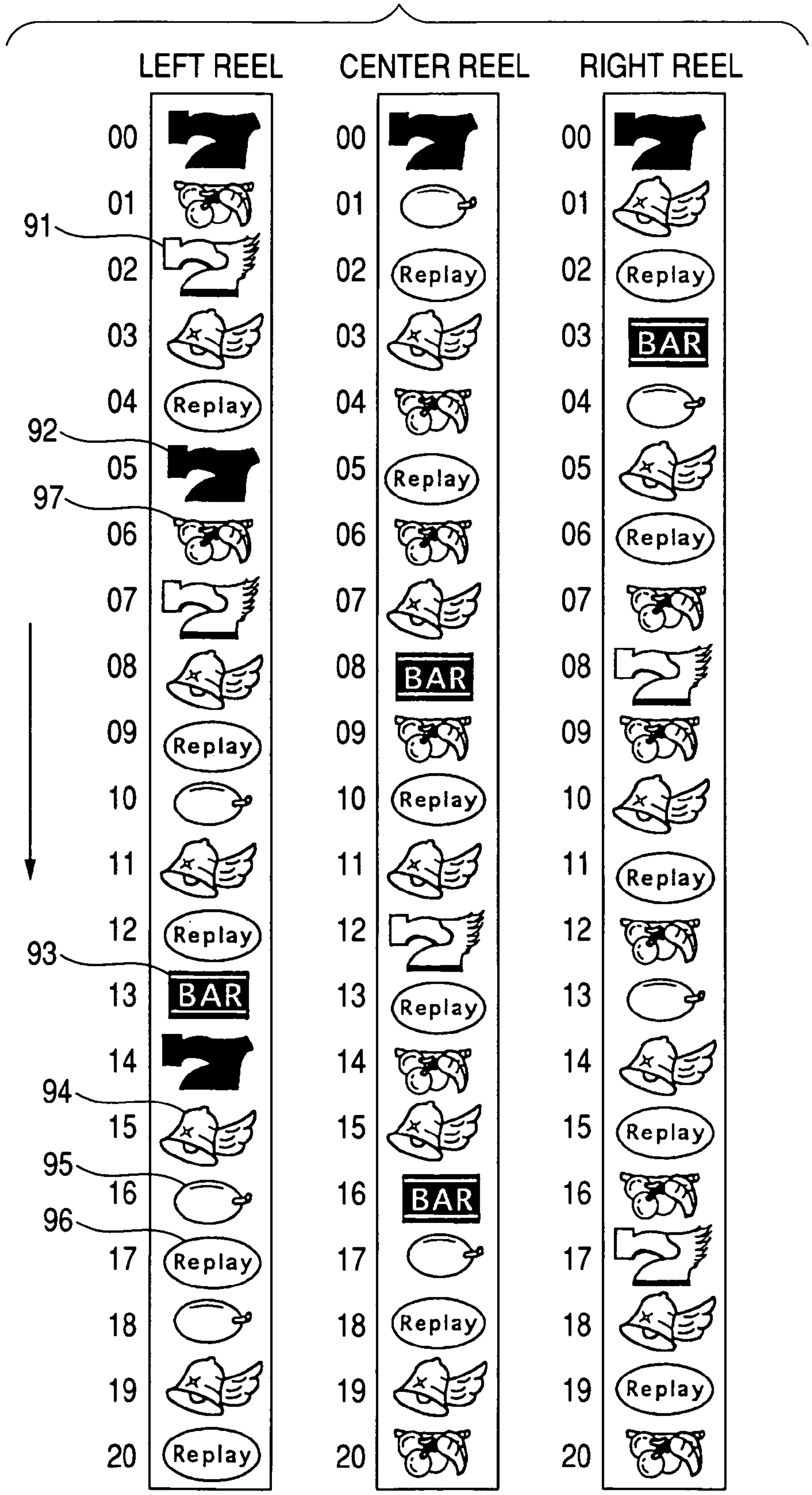
FIG. 7 is a drawing to show symbol rows drawn on the outer peripheral surfaces of the reels in the first embodiment of the invention.

FIG. 7 shows symbol rows each made up of 21 symbols represented on each reel 3L, 3C, 3R. The symbols are given code numbers 00 to 20 and are stored in ROM 32 (shown in FIG. 9) described later as a data table.

The symbol rows each made up of symbols of "blue 7 (symbol 91)," "red 7 (symbol 92)," "BAR (symbol 93)," "bell (symbol 94)," "plum (symbol 95)," "Replay (symbol 96)," and "cherry (symbol 97)" are represented on the reels 3L, 3C, and 3R. The reels 3L, 3C, and 3R are rotated so that the symbol rows move in the arrow direction in FIG. 7.

FIG. 8 shows the prizes and the numbers of payout medals corresponding to the winning symbol combinations in each gaming state.

The gaming state generally is classified depending on whether or not the internal winning of BB or RB is accepted or whether or not BB or RB operates. The types of prizes having the possibility of accepting internal winning are determined according to a probability lottery table; generally, the probability lottery table is provided for each gaming state.

That is, the types of prizes having the possibility of accepting internal winning become the same for games in the same gaming state. However, BB gaming state contains ordinary gaming state in BB and RB gaming state and contains the state in which the types of prizes having the possibility of accepting internal winning differ.

As shown in FIG. 8, when "blue 7-blue 7-blue 7" or "red 7-red 7-red 7" is placed in a row along the activated line in the ordinary gaming state, a winning game of BB is complete and 15 medals are paid out to the player and the gaming state of the next game enters the BB gaming state.

The RB gaming state occurs when the symbol combination along the activated line is "BAR-BAR-BAR" in the ordinary gaming state or when the symbol combination along the activated line is "Replay-Replay-Replay" in the ordinary gaming state in BB (JAC IN). At this time, 15 medals are paid out to the player.

The RB gaming state is a gaming state in which the player easily gains a prize of paying out 15 medals to the player with completion of the predetermined symbol combination "Replay-Replay-Replay" as the player bets one medal.

The maximum number of games that can be played by the player in one RB gaming state (the number of RB games that can be played) is 12. The number of winning games that can be gained in the RB gaming state (the possible number of winning games of RB) is up to eight. That is, the RB gaming state exits if the number of games reaches 12 or if the number of winning games reaches eight.

The BB gaming state exits when the player performs the third stop operation in a predetermined game. For example, when the player performs the third stop operation in the last game in the third RB gaming state, the BB gaming state exits.

When the symbol combination along the activated line is "Replay-Replay-Replay" in the ordinary gaming state, a winning game of replay is complete. When a winning game of replay is complete, as many medals as the number of inserted medals are automatically inserted, so that the player can play a game without consuming medals.

As symbol combination "bell-bell-bell" is placed in a row along the activated line in the ordinary gaming state or the ordinary gaming state in BB, a winning game of small prize of bell is complete. When the internal winning of small prize of bell is accepted, whether or not the winning game is complete is determined by the table number (described later) and the operation order of the stop buttons 7L, 7C, and 7R by the player.

Specifically, the symbol combination "bell-bell-bell" is placed in a row along the activated line and the winning game of small prize of bell is complete only if the player operates the stop buttons 7L, 7C, and 7R in the operation order of the six operation orders corresponding to the table number. If the player operates the stop buttons 7L, 7C, and 7R in any order other than the operation order corresponding to the table number, the winning game of small prize of bell becomes incomplete.

It is possible to realize completion of winning games of "small prize of cherry," "small prize of BAR," and "small prize of plum" in the ordinary gaming state or the ordinary gaming state in BB. The numbers of medals paid out to the player are as shown in the figure.

In the ordinary gaming state, when the internal winning of small prize of bell is accepted, time period (assistance time period or AT) is provided for notifying the player of the operation order for realizing completion of the winning game. When the internal winning of small prize of bell is accepted in the time period, the player can surely realize completion of the winning game.

There are two assistance time period lottery conditions. The first lottery condition is when the internal winning of small prize of plum is accepted and the state is the ordinary gaming state. The second lottery condition is when the internal lottery is a blank in the assistance time period or concealment time period (described later). As either lottery condition is satisfied, assistance time period lottery processing (AT lottery processing) described later is performed.

The assistance time period is made up of a plurality of successive games, which will be hereinafter referred to as a set. Lottery as to the number of games in one set and the number of sets to be generated is held in the assistance time period lottery processing. The number of sets that can be generated is referred to as the number of sets. If the assistance time period lottery processing is performed in the assistance time period or the concealment time period and prize in the lottery is won, the number of sets is accumulated.

Whether or not the assistance time period is to be generated (actualized) is determined in assistance time period activation processing (AT activation processing) described later. The time period having the possibility that the assistance time period will occur after the lottery condition is satisfied and prize in the AT lottery is won (specifically, the time period in which the value of a number-of-sets counter (described later) is one or more in the ordinary gaming state and which is not the assistance time period) will be hereinafter referred to as the concealment time period. The time period other than the assistance time period or the concealment time period will be hereinafter referred to as the usual time period.

Figure 9:
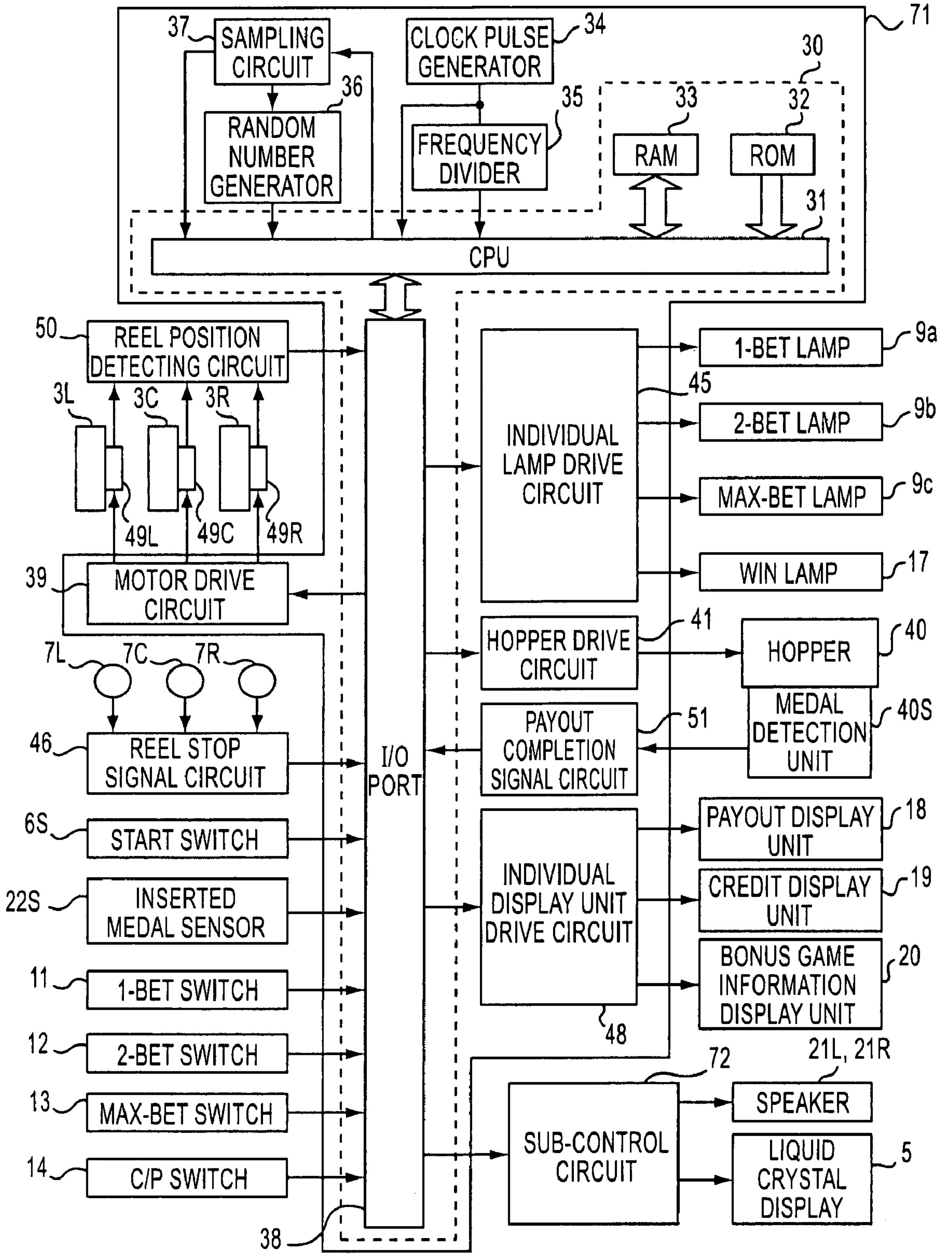
FIG. 9 is a block diagram to show the configuration of a main control circuit in the first embodiment of the invention.

FIG. 9 shows the circuit configuration including the above-mentioned main control circuit 71 (contained in internal lottery means) for controlling the game processing operation of the pinball slot machine 1, peripherals (actuators) electrically connected to the main control circuit 71, and a sub-control circuit 72 (contained in display control means) for controlling the liquid crystal display 5 and the speakers 21L and 21R based on a control command transmitted from the main control circuit 71.

The main control circuit 71 is made up of the microcomputer 30 placed on the circuit board as the main component and a random number sampling circuit. The microcomputer 30 includes a CPU 31 for performing the control operation in accordance with a preset program, and ROM 32 and RAM 33, both of which are provided as a storage.

Connected to the CPU 31 are a clock pulse generation circuit 34 for generating a reference clock pulse, a frequency divider 35, a random number generator 36 for generating sampled random numbers, and a sampling circuit 37.

For sampling random numbers, random number sampling may be executed in the microcomputer 30, namely, the operation program of the CPU 31. In this case, the random number generator 36 and the sampling circuit 37 can be omitted or can also be left for backup of the random number sampling operation.

The ROM 32 of the microcomputer 30 stores probability lottery tables used to determine random number sampling performed each time the player operates the start lever 6 (start operation), stop control tables for determining the reel stop mode in response to operation of the stop buttons, various control commands to be transmitted to the sub-control circuit 72, and to other circuits.

The commands include commands such as a standby screen command and a start command. The commands will be discussed later. The sub-control circuit 72 does not input commands and information to the main control circuit 71 and one-way communications are conducted from the main control circuit 71 to the sub-control circuit 72.

In the circuitry in FIG. 9, the main actuators whose operation is controlled by a control signal from the microcomputer 30 include the various lamps (1-BET lamp 9*a*, 2-BET lamp 9*b*, MAX-BET lamp 9*c*, and WIN lamp 17), the various display units (payout display unit 18, credit display unit 19, and bonus game information display unit 20), a hopper (containing a drive section for paying out medals) 40 as game play value giving means for storing medals and paying out a predetermined number of medals according to an instruction of a hopper drive circuit 41, and stepping motors 49L, 49C, and 49R for rotating the reels 3L, 3C, and 3R.

Further, a motor drive circuit 39 for driving and controlling the stepping motors 49L, 49C, and 49R, a hopper drive circuit 41 for driving and controlling the hopper 40, a individual lamp drive circuit 45 for driving and controlling the various lamps, and a individual display unit drive circuit 48 for driving and controlling the various display units are connected to the output section of the CPU 31 through an I/O port 38. Each of these drive circuits receives a control signal such as a drive command output from the CPU 31 and controls the operation of the corresponding actuator.

The main input signal generation means for generating an input signal required for generating a control command by the microcomputer 30 includes a start switch 6S, the 1-BET switch 11, the 2-BET switch 12, the MAX-BET switch 13, the C/P switch 14, a game assistance switch 99, an inserted medal sensor 22S, a reel stop signal circuit 46, a reel position detecting circuit 50, and a payout completion signal circuit 51. These are also connected to the CPU 31 through the I/O port 38.

The start switch 6S detects the player operating the start lever 6. The inserted medal sensor 22S detects a medal inserted to the medal insertion slot 22. The reel stop signal circuit 46 generates a stop signal as the player operates each stop button 7L, 7C, 7R. The reel position detecting circuit 50 receives a pulse signal from a reel rotation sensor and supplies a signal for detecting the position of each reel 3L, 3C, 3R to the CPU 31. The payout completion signal circuit 51 generates a signal for detecting completion of medal payout when the count of a medal detection unit 40S (the number of medals paid out from the hopper 40) reaches the specified number of medals.

In the circuitry in FIG. 9, the random number generator 36 generates random numbers contained in a given numeric value range and the sampling circuit 37 samples one random number at the appropriate timing after the player starts the start lever 6. The CPU 31 determines the internal winning combination based on the random number thus sampled and the probability lottery table stored in the ROM 32. Therefore, the CPU 31 implements winning state determination means for determining the winning state of the game, namely, the internal winning combination by random number lottery.

After rotation of each of the reels 3L, 3C, and 3R is started, the number of drive pulses supplied to each of the stepping motors 49L, 49C, and 49R and the counts are written into a predetermined area of the RAM 33. A reset pulse is obtained every revolution of the reel 3L, 3C, 3R and the reset pulses are input to the CPU 31 through the reel position detecting circuit 50. The drive pulse counts written in the RAM 33 are cleared to "0" according to the reset pulses thus obtained. Accordingly, the counts corresponding to the rotation positions of the reels 3L, 3C, and 3R within the range of one revolution are stored in the RAM 33.

A symbol table is stored in the ROM 32 to relate the rotation positions of the reels 3L, 3C, and 3R and the symbols drawn on the outer peripheral surfaces of the reels to each other. In the symbol table, the code numbers given in sequence every given rotation pitch of each reel 3L, 3C, 3R based on the rotation position where the reset pulse is generated and the symbol codes indicating the symbols provided in one-to-one correspondence with the code numbers are related to each other.

Further, a winning symbol combination table is stored in the ROM 32. The winning symbol combination table lists the symbol combinations of winning games, the numbers of payout medals for the winning games, and the winning game determination codes representing the winning games in association with each other. The winning symbol combination table is referenced at the stop control time of the left reel 3L, the center reel 3C, the right reel 3R and when the winning game is confirmed after all reels are stopped.

If the internal winning is accepted according to lottery processing based on the random number sampling (probability lottery processing), the CPU 31 sends the stop control signal of the reels 3L, 3C, and 3R to the motor drive circuit 39 based on the operation signal sent from the reel stop signal circuit 46 at the timing at which the player operates the stop buttons 7L, 7C, and 7R, and the selected stop control table. The CPU 31 functions as stop control means for performing stop control of the reels 3L, 3C, and 3R.

When the player pushes the stop button 7L, 7C, 7R, the stop control table is referenced and is used to determine the stop position of the reel.

Specifically, when the player pushes the stop button 7L, 7C, 7R, the symbol positioned on the center line 8*c* on the reel corresponding to the operated stop button (specifically, the symbol whose center is positioned above the center line 8*c* and is nearest to the position of the center line 8*c*) is detected, the code number of the symbol (operation position) is collated with the stop control table, and the code number of the symbol to be stopped at the position of the center line 8*c* (stop position) is determined.

The stop control table used when the internal winning of small prize of bell is accepted will be discussed with reference to FIGS. 10 through 12.

The stop control table lists the stop operation positions and the stop control positions of the reels 3L, 3C, and 3R. The stop operation position represents the code number of the symbol positioned on the center line 8*c* (specifically, the symbol whose center is positioned above the center line 8*c* and is nearest to the position of the center line 8*c*) when the player operates the stop button 7L, 7C, 7R provided corresponding to the reel 3L, 3C, 3R. The stop control position represents the code number of the symbol stopped and displayed at the position of the center line 8*c* when the reel stopped by the player actually stops. In the embodiment, the number of slide frames is four at the maximum. For example, when "cherry" with code number 12 (symbol 97 in FIG. 7) arrives at the position of the center line 8*c* while the right reel 3R is rotating, if the player operates the stop button 7R, stop control of the right reel 3R can be performed so as to stop and display "blue 7" with code number 8 (symbol 91 in FIG. 7) at the position of the center line 8*c*.

FIG. 10 shows a winning stop control table. This table is used when stop control of the reels is performed so that "bell-bell-bell" is placed in a row along the activated line and the winning game of small prize of bell is complete after the internal winning of small prize of bell is accepted.

In FIG. 10, the stop control position of the left reel 3L is any of code number "03", "08", "11", "15", or "19". In the symbol row shown in FIG. 7, the symbols corresponding to these code numbers are bell (symbol 94).

In FIG. 10, the stop control position of the center reel 3C is any of code number "03", "07", "11", "15", or "19". In the symbol row shown in FIG. 7, the symbols corresponding to these code numbers are bell (symbol 94).

In FIG. 10, the stop control position of the right reel 3R is any of code number "01", "05", "10", "14", or "18". In the symbol row shown in FIG. 7, the symbols corresponding to these code numbers are bell (symbol 94).

If the winning stop control table shown in FIG. 10 is thus used for stop control of the reels 3L, 3C, and 3R, "bell-bell-bell" is stopped and displayed at the position of the center line 8*c*, namely, at the centers of the display windows 4L, 4C, and 4R, and the winning game is complete.

FIG. 11 shows a forward push (left center right), center push (center left right) losing stop control table. This table is used when stop control of the reels is performed so that "bell-bell-bell" is not placed in a row along the activated line (the winning game of small prize of bell is incomplete) after the internal winning of small prize of bell is accepted. The stop control positions corresponding to the stop operation positions of the left reel 3L and the center reel 3C are the same as those shown in FIG. 10.

In FIG. 11, the stop control position of the right reel 3R is any of code number "02", "06", "11", "15", or "19". In the symbol row shown in FIG. 7, the symbols corresponding to these code numbers are "Replay (symbol 96)."

If the forward push, center push losing stop control table shown in FIG. 11 is thus used for stop control of the reels 3L, 3C, and 3R, "bell-bell" is stopped and displayed at the centers of the display windows 4L and 4C, and "Replay" is stopped and displayed at the center of the display window 4R and thus the winning game of small prize of bell becomes incomplete.

FIG. 12 shows a reverse push (right center left) losing stop control table. This table is used when stop control of the reels is performed so that "bell-bell-bell" is not placed in a row along the activated line (the winning game of small prize of bell is incomplete) after the internal winning of small prize of bell is accepted. The stop control positions corresponding to the stop operation positions of the center reel 3C and the right reel 3R are the same as those shown in FIG. 10.

In FIG. 12, the stop control position of the left reel 3L is any of code number "04", "09", "12", "17", or "20". In the symbol row shown in FIG. 7, the symbols corresponding to these code numbers are "Replay (symbol 96)."

If the reverse push losing stop control table shown in FIG. 12 is thus used for stop control of the reels 3L, 3C, and 3R, "Replay" is stopped and displayed at the center of the left display window 4L and "bell-bell" is stopped and displayed at the centers of the display windows 4C and 4R, and thus the winning game of small prize of bell becomes incomplete.

The number of slide frames described above indicates the number of symbols moved until the reel stops after the player operates the stop button and is represented by the absolute value of the difference between the operation position in the stop control table (the code number of the symbol positioned on the center line when the player operates the stop button) and the stop position (the code number of the symbol stopped on the center line when the reel actually stops).

The number of slide frames may be called the number of pulled-in frames." In the embodiment, the number of slide frames is four at the maximum. For example, when "cherry" with code number 12 (symbol 97 in FIG. 7) arrives at the position of the center line 8*c* while the right reel 3R is rotating, if the player operates the stop button 7R, stop control of the right reel 3R can be performed so as to stop and display "blue 7" with code number "08" (symbol 91 in FIG. 7) at the position of the center line 8*c*.

On the other hand, in the stop mode indicating completion of the winning game of internal winning combination, the CPU 31 supplies a payout command signal to the hopper drive circuit 41 for paying out a predetermined number of medals to the player from the hopper 40.

At the time, the medal detection unit 40S counts the number of medals paid out from the hopper 40. When the count reaches the specified number of medals, a medal payout completion signal is input to the CPU 31, which then stops driving the hopper 40 through the hopper drive circuit 41 and terminates the medal payout processing.

Figure 13:
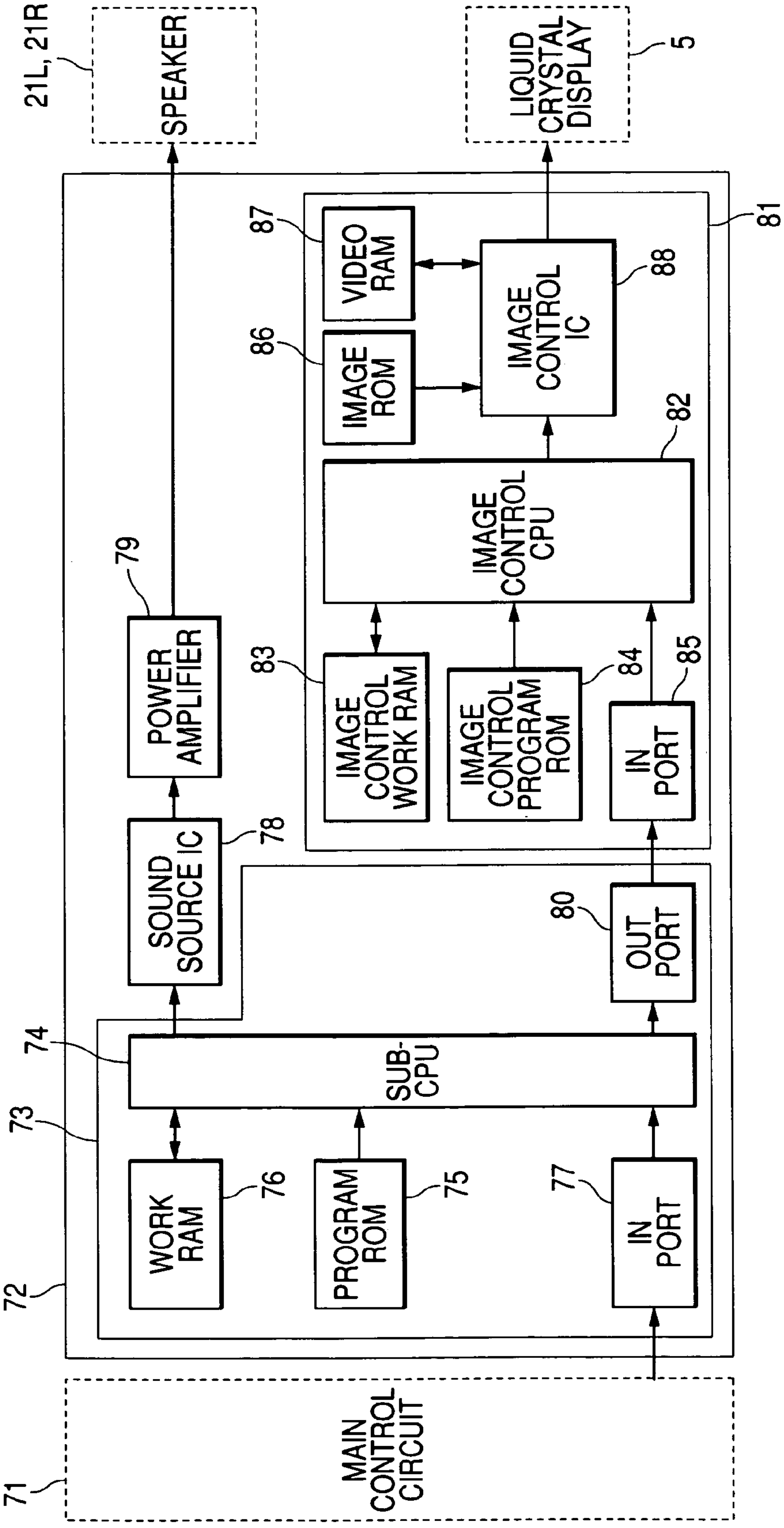
FIG. 13 is a block diagram to show the configuration of a sub-control circuit in the first embodiment of the invention.

FIG. 13 shows the configuration of the sub-control circuit 72. The sub-control circuit 72 is disposed on the liquid crystal display control board 720*a* and performs display control of the liquid crystal display 5 and output control of sound from the speakers 21L and 21R based on the control commands from the main control circuit 71. The sub-control circuit 72, which is implemented on a separate circuit board from the circuit board implementing the main control circuit 71, is made up of a microcomputer (sub-microcomputer) 73 as the main component, an image control circuit 81 for performing display control of the liquid crystal display 5, a sound source IC 78 for controlling sound output from the speakers 21L and 21R, and a power amplifier 79.

The sub-microcomputer 73 includes a sub-CPU 74 for performing the control operation following a control command transmitted from the main control circuit 71, program ROM 75 as storage means, and work RAM 76. The signal from the main control circuit 71 to the sub-microcomputer 73 is input through an IN port 77, and the signal to the image control circuit 81 is output through an OUT port 80.

The sub-control circuit 72 does not include a clock pulse generation circuit, a frequency divider, a random number generator, or a sampling circuit, but executes random number sampling in an operation program of the sub-CPU 74. Generation of the assistance time period, etc., is determined as the random number sampling is executed.

The sub-CPU 74 includes the number-of-AT-sets counter and a number-of-AT-games counter. The number-of-AT-sets counter stores the number of sets. The number-of-AT-games counter stores information concerning the number of games in one assistance time period.

The program ROM 75 stores a control program executed in the sub-CPU 74. The work RAM 76 is used as temporary storage means for the sub-CPU 74 to execute the control program.

The image control circuit 81 is made up of an image control CPU 82, an image control work RAM 83, image control program ROM 84, image ROM 86, video RAM 87, and an image control IC 88. The image control CPU 82 determines the display contents on the liquid crystal display 5 in accordance with an image control program stored in the image control program ROM 84 based on the parameters set in the sub-microcomputer 73. The signal from the sub-CPU 74 is input through an IN port 85.

The image control program ROM 84 stores the image control program involved in display on the liquid crystal display 5 and various selection tables. The image control work RAM 83 is used as temporary storage means for the image control CPU 82 to execute the image control program. The image control IC 88 forms an image responsive to the display contents determined by the image control CPU 82 and outputs the image to the liquid crystal display 5. The image ROM 86 stores dot data for forming an image. The video RAM 87 is used as temporary storage means for the image control IC 88 to form an image.

On the other hand, the sub-CPU 74 displays an image on the liquid crystal display 5 based on the command signal from the CPU 31.

Specifically, whenever a stop signal is input from the reel stop signal circuit 46 as the player operates the start lever 6 or the stop button 7L, 7C, 7R, the sub-CPU 74 transmits a signal to the image control CPU 82 and displays an image on the display screen 5*a* of the liquid crystal display 5. The sub-CPU 74 and the image control CPU 82 are contained in display control means.

Thus, the pinball slot machine 1 (contained in gaming machine) according to the first embodiment of the invention includes a main control circuit 71 (contained in internal lottery means) for determining internal lottery of game with a random number at a predetermined timing, the liquid crystal display 5 (contained in display means) for displaying the effect image concerning each game, the liquid crystal display control board 720*a* (contained in display control means) for controlling the liquid crystal display 5, and the hooks 223*a* and 223*b* and the projections 724*a* and 724*b* formed with the attachment holes (contained in attachment means) for hooking the liquid crystal display control board 720*a* on the cabinet section 200*b* of the gaming machine 1. Thus, to fix the liquid crystal display control board 720*a,* the hooks 223*a* and 223*b* are simply hooked in the attachment holes, whereby the liquid crystal display control board 720*a* is temporarily tacked to the cabinet section 200*b,* and attaching the liquid crystal display control board 720*a* is facilitated. Therefore, the number of steps required for attachment and detachment of the liquid crystal display control board 720*a* can be reduced. Since the liquid crystal display control board 720*a* is easily detached, it is suited for recycling the parts (here, the liquid crystal display control board 720*a*).

In the description of the embodiment, the hooks 223*a* and 223*b* provided on the cabinet section 200*b* and the attachment holes made in the liquid crystal display control board 720*a* are used as the attachment means. In the invention, however, if attachment holes are formed on the cabinet section 200*b* and hooks are provided on the liquid crystal display control board 720*a,* similar advantages can also be provided. Further, the liquid crystal display control board 720*a* is formed with hooks easily broken where parts replacement is made more frequently than the cabinet section 200*b,* whereby the wear at the parts replacement time can be prevented and maintenance can be conducted efficiently. The hooks may be oriented upward or downward.

In the description of the embodiment, to attach the liquid crystal display control board 720*a* to the cabinet section 200*b,* they are screwed at two points and are hooked at two points. In the invention, however, if they are screwed at one point and are hooked at two points, similar advantages can also be provided. In this case, preferably the screw point is placed on the vertical line passing through the midpoint between the two hook points. As they are thus screwed at one point, the number of steps required for attachment and detachment can be reduced as compared with the embodiment.

Further, in the description of the embodiment, the liquid crystal display control board 720*a* is screwed into the cabinet section 200*b* at two points. In the invention, however, if a plastic fastener, such as a detachable snap fit, rather than the screws is used, similar advantages can also be provided. Alternatively, two or more points may be fixed by a method such as a snap fit instead of hooking the liquid crystal display control board 720*a* using the hooks and the attachment holes.

Second Embodiment

A pinball slot machine according to a second embodiment of the invention is almost the same as that according to the first embodiment except for attachment parts or attachment method of liquid crystal display control board 720*a* and therefore components identical with those previously described with reference to FIGS. 1 to 3 are denoted by the same reference numerals in FIGS. 14A and 14B and FIGS. 15A and 15B and will not be discussed again.

Figure 14A:
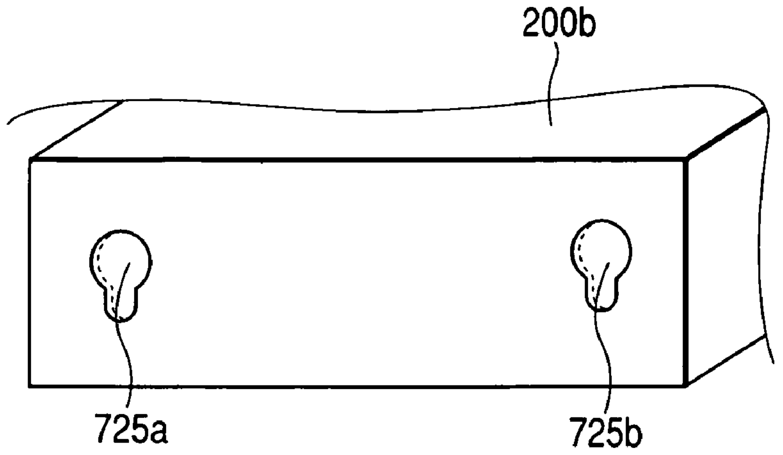
FIGS. 14A and 14B are drawings to show a part of a cabinet and the back of a liquid crystal display control board attached to the cabinet in a second embodiment of the invention.
Figure 14B:
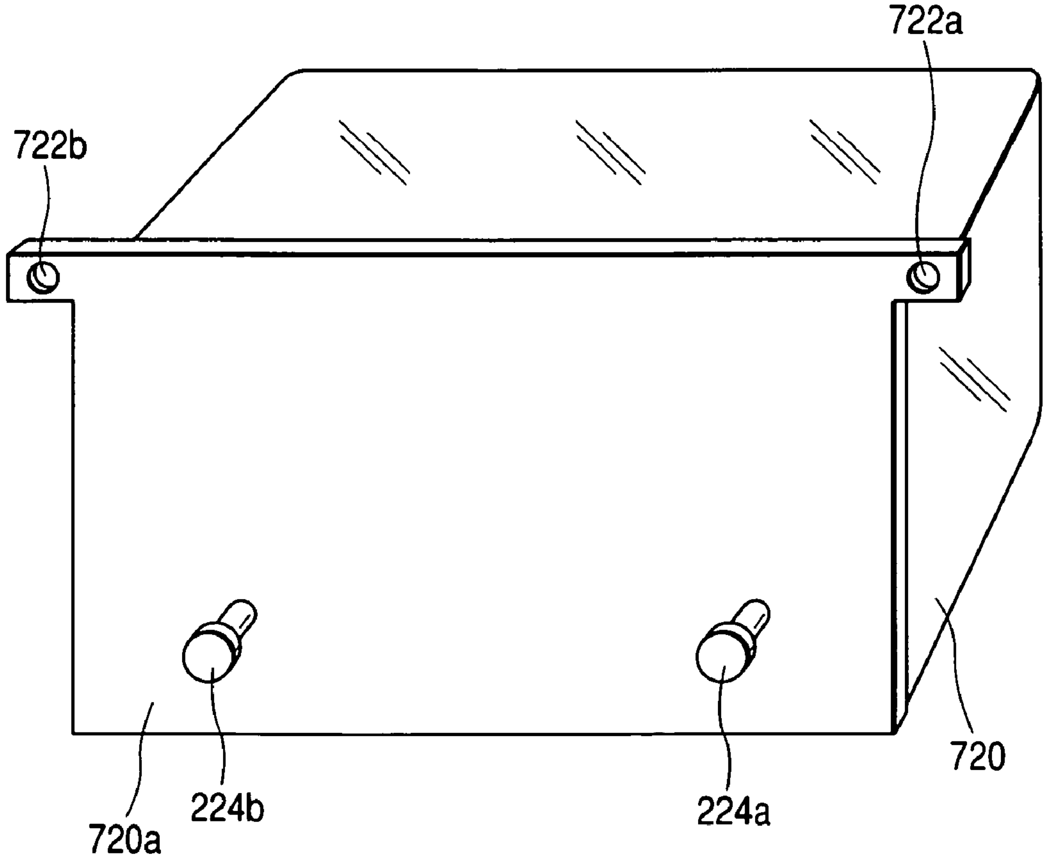

FIGS. 14A and 14B show the back of a liquid crystal display control board and a part of a cabinet to which the liquid crystal display control board is attached in the second embodiment of the invention.

In FIG. 14A, two attachment holes 725*a* and 725*b* each of a predetermined shape to attach projections 224*a* and 224*b* (described later) are made roughly horizontally in the attachment face of a cabinet section 200*b* (a part of cabinet) below the upper frame of a door 200*a* of a cabinet 200 of a pinball slot machine 1. On the other hand, in FIG. 14B, two projections 224*a* and 224*b* each having a head and a bar-like barrel are formed at lower positions of the back of a liquid crystal display control board 720*a* to be attached to the cabinet section 200*b* so that the projections become roughly horizontal at the attachment time. The projections 224*a* and 224*b* have each a thickness and a length to such an extent that they can hold the weight of the liquid crystal display control board 720*a* in hooking the liquid crystal display control board 720*a.* Two screw holes 722*a* and 722*b* for screwing are made at the upper left and right ends of the liquid crystal display control board 720*a* so that the screw holes become roughly horizontal at the attachment time. The screw holes 722*a* and 722*b* are disposed outside the projections 224*a* and 224*b* and the spacing between the screw holes 722*a* and 722*b* is set larger than the spacing between the projections 224*a* and 224*b* to stabilize the attachment state as the fixed portion spacing is made large.

Figure 15A:
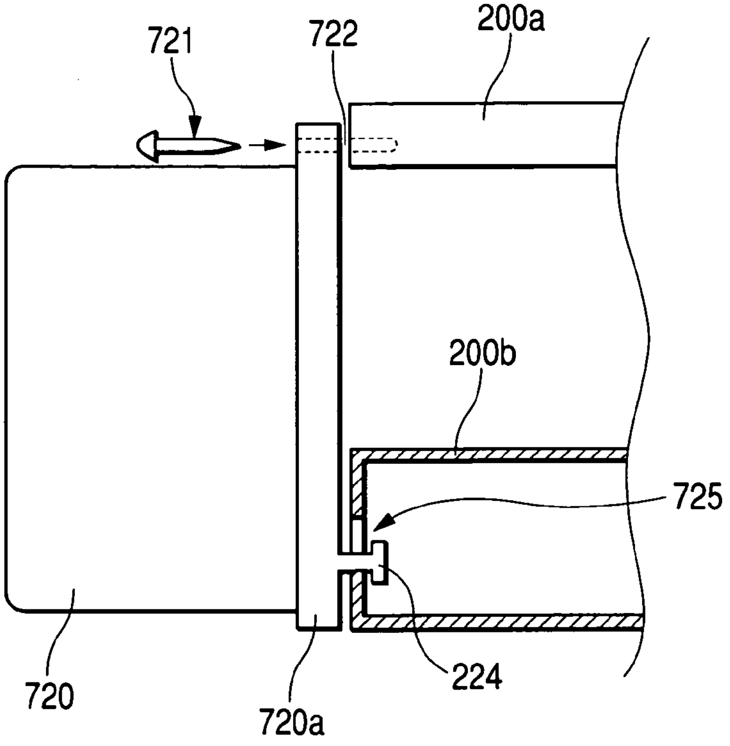
FIGS. 15A and 15B are drawings to show a method of attaching the liquid crystal display control board in the second embodiment of the invention.
Figure 15B:
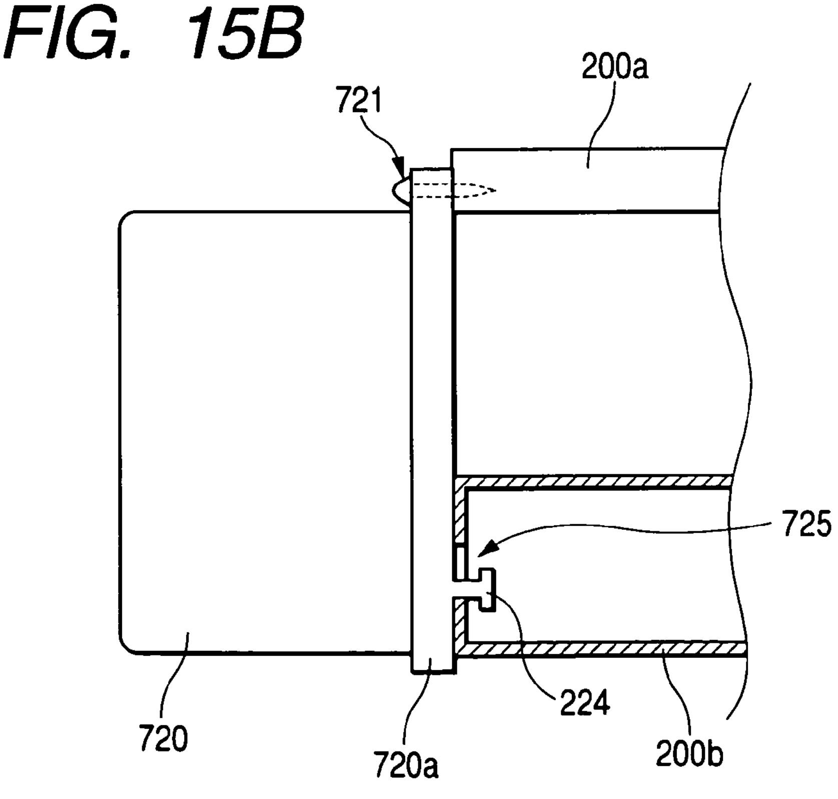

According to the configuration, first the projections 224*a* and 224*b* formed on the back of the liquid crystal display control board 720*a* are inserted into and attached onto the attachment holes 725*a* and 725*b* made in the attachment face of the cabinet section 200*b* for temporarily tacking the liquid crystal display control board 720*a* to the cabinet section 200*b* (FIG. 15A). Next, screws 721 are inserted into the screw holes 722 (722*a* and 722*b*) at the upper ends of the liquid crystal display control board 720*a* temporarily tacked to the cabinet section 200*b,* and the liquid crystal display control board 720*a* is screwed into the upper frame of the rear of the door 200*a* (FIG. 15B). In the embodiment, on the rear of the door 200*a,* the liquid crystal display control board 720*a* is disposed on the cabinet above the liquid crystal display 5 and parts of obstacles to upper move of the liquid crystal display control board 720*a* are not close to, so that hooking the liquid crystal display control board 720*a* using the projections 224*a* and 224*b* each having a head and a barrel and the attachment holes 725*a* and 725*b* is facilitated.

Third Embodiment

A pinball slot machine according to a third embodiment of the invention is almost the same as that according to the first embodiment except for attachment parts or attachment method of liquid crystal display control board 720*a* and therefore components identical with those previously described with reference to FIGS. 1 to 3 are denoted by the same reference numerals in FIG. 16 and will not be discussed again.

Figure 16:
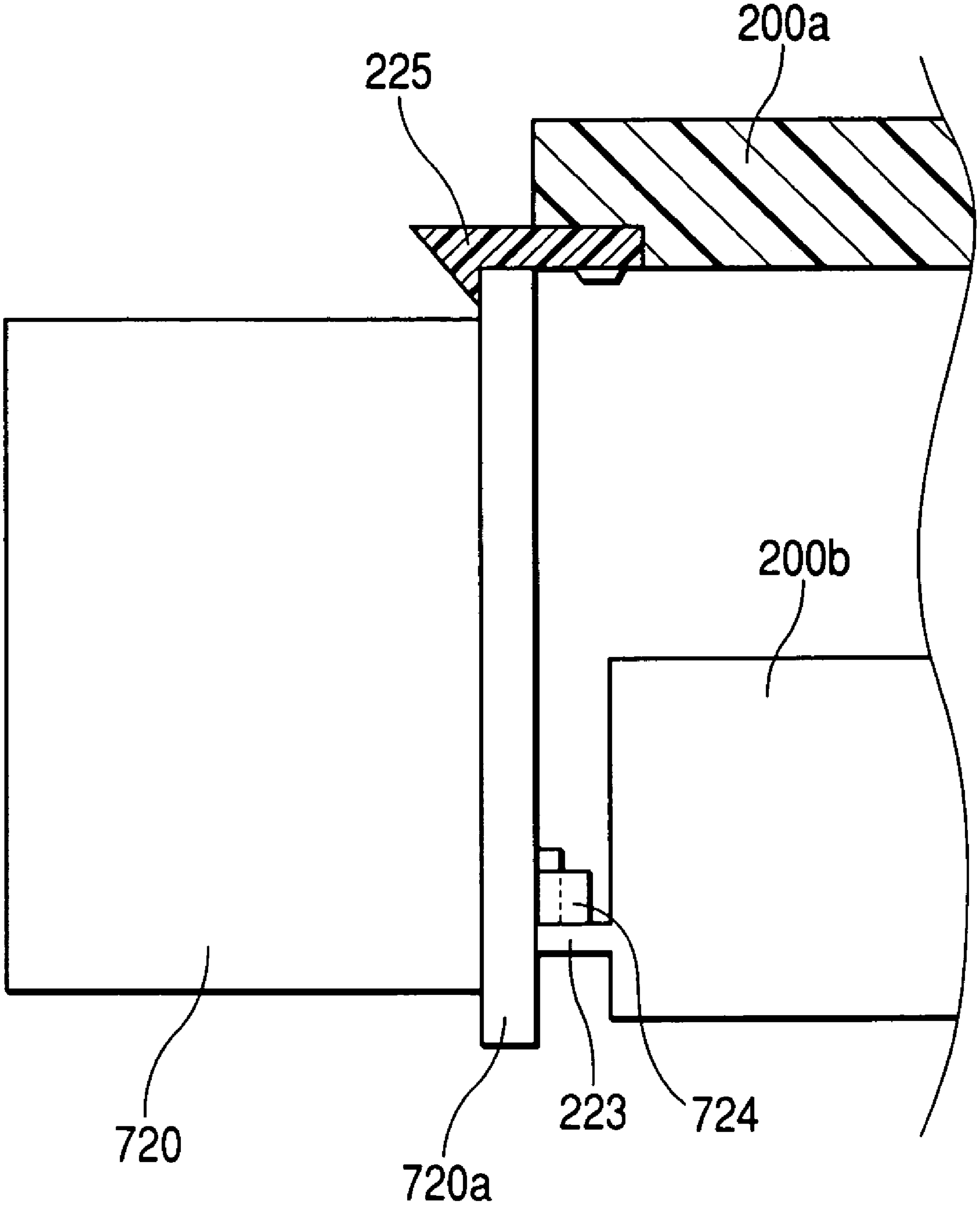
FIG. 16 is a drawing to show a method of attaching a liquid crystal display control board in a third embodiment of the invention.

FIG. 16 shows a state in which a liquid crystal display control board is attached to a cabinet in the third embodiment of the invention.

In FIG. 16, a cabinet section 200*b* (a part of cabinet) lower than the upper frame of a door 200*a* of a cabinet 2 of a pinball slot machine 1 is formed with two hooks 223*a* and 223*b* upward and roughly horizontally as in the first embodiment. On the other hand, a liquid crystal display control board 720*a* to be attached to the cabinet section 200*b* is formed in lower positions of the back with two projections 724*a* and 724*b* each having an attachment hole (hook hole) so that the projections become roughly horizontal at the attachment time. A hood-like retention member 225 having a claw for hooking the upper end of the liquid crystal display control board 720*a* at an end is attached to the upper frame of the door 200*a*. This hood-like retention member 225 is formed of a plastic resin material, a metal material, etc., having hardness and elasticity to such an extent that the liquid crystal display control board 720*a* can be retained and held. The length of the hood-like retention member 225 in the width direction thereof (the length of the portion touching the liquid crystal display control board 720*a*) is set smaller than the spacing between projections 223*a* and 223*b*. The touch length and area are large as compared with the case where the liquid crystal display control board 720*a* is attached using screw holes 722*a* and 722*b* and thus if the length of the hood-like retention member 225 in the width direction thereof is smaller than the spacing between the projections 223*a* and 223*b,* the attachment state is stable.

According to the configuration, first the projections 223*a* and 223*b* formed on the back of the liquid crystal display control board 720*a* are inserted into and attached onto attachment holes 725*a* and 725*b* made in the attachment face of the cabinet section 200*b* for temporarily tacking the liquid crystal display control board 720*a* to the cabinet section 200*b*. Next, the upper end of the liquid crystal display control board 720*a* temporarily tacked to the cabinet section 200*b* is attached onto the claw of the hood-like retention member 225 attached to the upper rear frame of the door 200*a* and is fixed. In the embodiment, on the rear of the door 200*a,* the liquid crystal display control board 720*a* is disposed on the cabinet above the liquid crystal display 5 and parts of obstacles to upper move of the liquid crystal display control board 720*a* are not close to, so that it is easy to hook the liquid crystal display control board 720*a* using the hooks 223 and the attachment holes and further hook the liquid crystal display control board 720*a* on the claw of the hood-like retention member 225 and fix the liquid crystal display control board 720*a*. The liquid crystal display control board 720*a* can be attached in an easier manner than screwing.

In the description of the embodiment, the liquid crystal display control board 720*a* is attached onto the claw of the hood-like retention member 225 on the door 200*a*. In the invention, however, if square-bar-like retention members each having a claw formed at the tip of the square-bar-like member rather than the hood-like retention member 225 are disposed with the same spacing as that between projections 224*a* and 224*b,* similar advantages can also be provided. A method to use for attaching the hood-like retention member 225 to the cabinet may be, for example, screwing or bonding, but the invention is not limited to the method. Any attaching method may be used if the hood-like retention member 225 can be fixed. Alternatively, the hood-like retention member 225 may be formed integrally with the door 200*a*.

As described above, according to the invention, the display control means (containing the liquid crystal display control board) can be temporarily tacked to the cabinet by the attachment means (containing the hooks and the attachment holes), so that when the display control means is fixed to the cabinet, it can be fixed from the temporary tack state. Therefore, the number of steps required for fixing and detaching the display control means can be reduced.

According to the invention, the display control means can be temporarily tacked to the cabinet simply by inserting the hooks into the hook holes. Thus, the display control means can be easily attached and detached as compared with the case where immediately the display control means is fixed to the cabinet.

According to the invention, the display control means is disposed at the upper end of the cabinet, so that the display control means is easily detached and attached as compared with the case where the display control means is disposed in a lower position of the cabinet. Further, since the display control means is hooked using the hooks and the hook holes before it is fixed, the display control means can be reliably attached while the number of fixing steps is reduced.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

This application is related to co-pending U.S. patent applications entitled "GAMING MACHINE" referred to as 10/697,942, "GAMING MACHINE" referred to as 10/697,946, "GAMING MACHINE" referred to as 10/697,244, "GAMING MACHINE" referred to as 10/697,441, "GAMING MACHINE" referred to as 10/697,249, "GAMING MACHINE" referred to as 10/697,004, "GAMING MACHINE" referred to as 10/697,251, "GAMING MACHINE" referred to as 10/697,254, "GAMING MACHINE" referred to as 10/697,005, "GAMING MACHINE" referred to as 10/697,006, "GAMING MACHINE" referred to as 10/697,259, "GAMING MACHINE" referred to as 10/697,007, "GAMING MACHINE" referred to as 10/697,042, "GAMING MACHINE" referred to as 10/697,158, "GAMING MACHINE" referred to as 10/697,039, "GAMING MACHINE" referred to as 10/697,157, "GAMING MACHINE" referred to as 10/697,040, "GAMING MACHINE" referred to as 10/697,041, "GAMING MACHINE" referred to as 10/697,026, "GAMING MACHINE" referred to as 10/697,054, "GAMING MACHINE" referred to as 10/697,082, "GAMING MACHINE" referred to as 10/697,088, "GAMING MACHINE" referred to as 10/697,080, "GAMING MACHINE" referred to as 10/697,081, "GAMING MACHINE" referred to as 10/697,027, "GAMING MACHINE" referred to as 10/697,086, "GAMING MACHINE" referred to as 10/697,237, "GAMING MACHINE" referred to as 10/697,238, "GAMING MACHINE" referred to as 10/697,947, "GAMING MACHINE" referred to as 10/697,245, "GAMING MACHINE" referred to as 10/697,246, "GAMING MACHINE" referred to as 10/697,248, "GAMING MACHINE" referred to as 10/697,084, "GAMING MACHINE" referred to as 10/697,432, "MOTOR STOP CONTROL DEVICE" referred to as 10/697,085, "GAMING MACHINE" referred to as 10/697,256, "GAMING MACHINE" referred to as 10/697,281, "GAMING MACHINE" referred to as 10/697,261, and "GAMING MACHINE" referred to as 10/697,258, respectively, all the applications being filed on Oct. 31, 2003 herewith. The co-pending applications including specifications, drawings, and claims are expressly incorporated herein by reference in their entirety.

What is claimed is:

1. A gaming machine supported on a horizontal support surface and extending vertically upwardly therefrom, the gaming machine comprising:

a cabinet;

a display device provided in the cabinet and configured to display an image pertinent to the game;

a part provided in the gaming machine; and an attachment device configured to attach the part on the cabinet, wherein the attachment device includes:

a hook provided on one of the part and the cabinet, the hook configured to attach the part on the cabinet, the hook having a horizontal hook portion and a vertical hook portion, the horizontal hook portion extending horizontally from the one of the part and the cabinet and terminating in a horizontal hook portion end, the vertical hook portion attached to the horizontal hook portion end and extending generally vertically upwardly therefrom; and a projection defining a hook hole extending vertically and formed on a remaining one of the part and the cabinet, the hook hole sized and adapted to receive the vertical hook portion in a manner that the projection thereafter rests on the horizontal hook portion in a contacting relationship and is operative to slidably move horizontally on and along the horizontal hook portion between the vertical hook portion and the one of the part and the cabinet while maintaining the contacting relationship with the horizontal hook portion, wherein the part is hooked at an upper end of the cabinet with the hook and the hook hole to be displaceable in an upward direction, and wherein the part is fixed onto the cabinet at a pre-determined portion.

2. The gaming machine as claimed in claim 1, further comprising a display control device and wherein the attachment device includes a threaded screw and wherein the display control device includes a screw hole such that when the attachment device attaches the display control device on the cabinet, the screw extends into and through the screw hole and is threadably engaged with the cabinet thereby pressing at least a portion of the display control device against the cabinet.

3. The gaming machine as claimed in claim 1, wherein the cabinet includes a door, wherein the part includes a display control device configured to control the display device, the display control device including a flat display control board, and wherein the display control device and the display device are provided on the door.

* * * * *